United States Patent
Flett

(10) Patent No.: US 9,853,567 B2
(45) Date of Patent: Dec. 26, 2017

(54) DC SOURCE-TO-AC GRID TIE-IN POWER ENHANCEMENT USING MULTILEVEL/MULTIPHASE INVERTER TOPOLOGY AND RESONANT MATRIX TANK CONVERTER

(71) Applicant: Rhombus Energy Solutions, Inc., San Diego, CA (US)

(72) Inventor: Frederick Flett, Indio, CA (US)

(73) Assignee: Rhombus Energy Solutions, Inc., San Diego, CA (US)

( * ) Notice: Subject to any disclaimer, the term of this patent is extended or adjusted under 35 U.S.C. 154(b) by 175 days.

(21) Appl. No.: 14/844,885

(22) Filed: Sep. 3, 2015

(65) Prior Publication Data

US 2015/0381074 A1 Dec. 31, 2015

Related U.S. Application Data

(63) Continuation-in-part of application No. 13/953,726, filed on Jul. 29, 2013, now Pat. No. 9,148,071.

(51) Int. Cl.
| | |
|---|---|
| *H02J 7/00* | (2006.01) |
| *H02M 7/537* | (2006.01) |
| *H02M 7/487* | (2007.01) |
| *H02M 3/156* | (2006.01) |
| *H02M 7/04* | (2006.01) |
| *H02J 3/38* | (2006.01) |
| *H02M 1/00* | (2006.01) |

(Continued)

(52) U.S. Cl.
CPC ........... *H02M 7/537* (2013.01); *H02M 3/156* (2013.01); *H02M 7/487* (2013.01); *H02J 3/383* (2013.01); *H02M 3/33569* (2013.01); *H02M 7/04* (2013.01); *H02M 2001/007* (2013.01); *H02M 2001/0058* (2013.01); *H02M 2001/0077* (2013.01); *H02M 2007/4815* (2013.01); *Y02B 70/1425* (2013.01); *Y02B 70/1433* (2013.01); *Y02B 70/1441* (2013.01); *Y02B 70/1491* (2013.01); *Y02E 10/563* (2013.01)

(58) Field of Classification Search
CPC ......................................................... H02J 7/00
USPC ......................................................... 320/101
See application file for complete search history.

(56) References Cited

U.S. PATENT DOCUMENTS

| | | | |
|---|---|---|---|
| 9,148,071 B2 * | 9/2015 | Flett | H02M 7/537 |
| 2015/0103574 A1 * | 4/2015 | Hintz | 363/132 |
| 2017/0008405 A1 * | 1/2017 | Bojarski | H02J 7/00 |

* cited by examiner

*Primary Examiner* — Suchin Parihar
(74) *Attorney, Agent, or Firm* — Jonathan A. Kidney; CKR Law

(57) ABSTRACT

A high efficiency multi-mode/multi-phase power conversion device has DC-boost receiving input power from a plurality of DC (e.g., solar) sources, power inverters and an AC grid supply. Power conversion switches are arranged in a stacked configuration with controllable inner and outer switches conveying: in an non-inverting switched mode, an AC voltage from power from the AC grid supply; in an inverting outer switched mode, an AC voltage from power from the AC grid supply; and in an inverting outer and inner switched mode, an inverted voltage from power from the DC-boost circuit. At least one input switch and output to the AC grid supply is coupled to an output of the power inverters and a resonant circuit is coupled to the input switch. A rectifier and/or high voltage AC output tap is coupled to the resonant circuit and a controller is coupled to the power conversion switches and the input switch.

20 Claims, 13 Drawing Sheets

(51) Int. Cl.
*H02M 7/48* (2007.01)
*H02M 3/335* (2006.01)

DC SOURCE-TO-AC GRID TIE-IN POWER ENHANCEMENT USING MULTILEVEL/MULTIPHASE INVERTER TOPOLOGY AND RESONANT MATRIX TANK CONVERTER

CROSS-REFERENCE TO RELATED APPLICATION(S)

This application is a Continuation-In-Part (CIP) of pending U.S. non-provisional patent application Ser. No. 13/953,726, filed Jul. 29, 2013, claiming the benefit thereof, the contents of which are hereby incorporated by reference in its entirety.

BACKGROUND

Field

This invention relates to efficient recovery of energy in a DC source-to-grid tie-in. More particularly, it relates to a higher efficiency power extraction paradigm with multiple operational modes.

Background

A popular inverter for variable DC power sources is the Neutral Point Clamped inverter (NPC), being recognized as one of the highest efficient inverters in the renewable energy conversion industry. The typical NPC inverter design utilizes offsetting DC boost stages that combine three level voltages ($+V_{dc}/2$; 0 V; and $-V_{dc}/2$) in a switched manner to achieve a very small ripple current. The DC boost stages power NPC inverter pairs that are "clamped" to a DC bus neutral connection. However, as efficient as the typical NPC inverter design is, as of yet, no consideration has been given to complementing the NPC inverter design with a multi-level/multi-phase inverter topology and resonant circuit for more efficient battery charging as well permitting alternative high voltage outputs. Accordingly, solutions to these and other shortcomings in the renewable energy conversion industry using a baseline inverter design, are elucidated in the following description.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a multi-phase, power conversion device is provided, comprising: a plurality of multi-level inverter phases, each inverter phase comprising: a DC-boost circuit configured to receive input power from a DC generating source; a power inverter coupled to an output of the DC-boost circuit and to an AC grid supply, having a plurality of power conversion switches arranged in a stacked configuration having controllable inner and outer switches; at least one output voltage from the power inverter, conveying: in an non-inverting switched mode, an AC voltage from power from the AC grid supply; in an inverting outer switched mode, an AC voltage from power from the AC grid supply; and in an inverting outer and inner switched mode, an AC inverted voltage from DC power boosted by the DC-boost circuit; at least one of an input switch and output to the AC grid supply, coupled to the at least one output voltage from the power inverter; a resonant circuit coupled to at least one input switch of each power inverter and configured for power amplification according to a resonant frequency operation of the input switches; at least one of a rectifier and high voltage AC output tap coupled to an output of the resonant circuit; and a controller coupled to the power conversion switches of the plurality of inverter phases and to the input switches.

In another aspect of the above embodiment, a rechargeable battery coupled to an output of the rectifier; and/or wherein the inverters are a neutral point clamped (NPC) inverter and the power conversion switches are at least one of field effect transistors (FETs) and Insulated Gate Bipolar Transistors (IGBT); and/or wherein the output voltages of the power inverters share a common node at a center of the stacked plurality of power conversion switches; and/or wherein the DC-boost circuits are a multi-stage DC-boost circuit, each stage being configured to receive power from an individual DC generating source; and/or wherein the input switches are a series connection of a pair of oppositely directly FETDs; and/or wherein the resonant circuit is a frequency tuned parallel L-C circuit sensitive to amplitude modulation control; and/or wherein the DC power sources are coupled to the inputs of the DC-boost circuits; and/or wherein the DC power sources are solar panels; and/or wherein the DC power sources are a plurality of solar panels and each inverter phase generates power that is approximately 120 degrees in separation representing a three phase system operation; and/or wherein an output of the rechargeable battery is input into the DC-boost circuits; and/or wherein at least one of the power conversion switches and input switches are controlled by a pulse width modulation (PWM) signal from the controller; and/or wherein at a duty cycle of the PWM signal is varied to achieve amplitude modulation; and/or wherein a frequency of the PWM signal is at least one of 30 kHz, 60 kHz, 25 kHz and 50 kHz; and/or wherein the at least one output voltage from the power inverters is measured from a junction between an inner and outer switch and from the common node; and/or wherein in an inverting outer switched mode, one of two output voltages from the power inverters is subjected to inversion to positively combine output voltages from the power inverters, resulting in a doubling of the output voltage.

In another aspect of the disclosed embodiments, a method for power conversion is provided, comprising: forming a multi-level/multi-phase system by joining a plurality of inverters phases, each inverter phase comprised by: configuring a DC-boost circuit to receive input power from a DC generating source; coupling a power inverter to an output of the DC-boost circuit and to an AC grid supply, the power inverter having a plurality of power conversion switches arranged in a stacked configuration having controllable inner and outer switches; conveying at least one output voltage from the power inverter, when: in an non-inverting switched mode, conveying an AC voltage from power from the AC grid supply; in an inverting outer switched mode, conveying an AC voltage from power from the AC grid supply; and in an inverting outer and inner switched mode, conveying an AC inverted voltage from DC power boosted by the DC-boost circuit; coupling at least one of a input switch and output switch to the AC grid supply to the at least one output voltage from the power inverters; coupling a resonant circuit to each power inverter's input switch, the resonant circuit being configured for power amplification according to a resonant frequency operation of the input switch and input power; coupling at least one of a rectifier and high voltage AC output tap to an output of the resonant circuit; coupling a controller to the power conversion switches of the inverter phases and to the input switches; and operating the controller to provide a PWM signal to at least one of the power conversion switches and input switches, according to a selected switched mode, to output a converted input power.

Another aspect of an embodiment of the above method comprises feeding the DC power sources with a plurality of solar panels, wherein each inverter phase generates power that is approximately 120 degrees in separation representing a three phase system; and/or coupling a rechargeable battery to an output of the rectifier; and/or wherein a frequency of the PWM signal is operated at a frequency of at least one of 30 kHz, 60 kHz, 25 kHz and 50 kHz.

DETAILED DESCRIPTION

Figure 1:
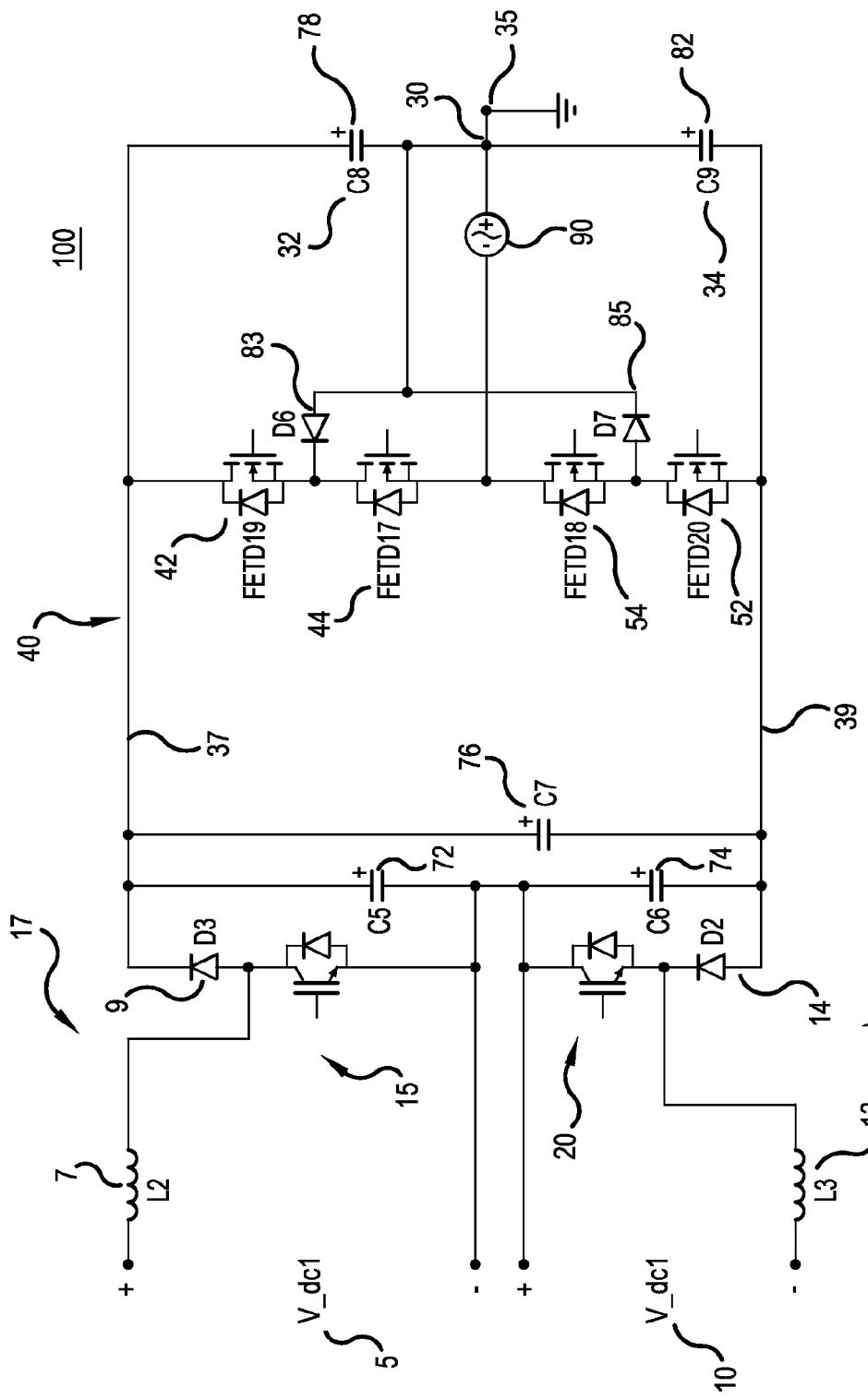
FIG. 1 is a schematic diagram of a related art NPC inverter circuit with two DC-voltage sources/generators.

Various embodiments described below allow for an inverter configured DC-AC system to operate with higher efficiency and multiple operational modes, by implementing a controlled resonator system. In addition to AC power being supplied by the DC source/generator, AC power from the grid can be utilized for DC backup charging, or for high voltage AC generation. Boost and bucking of the generated AC power can be facilitated by the resonator system, which provides a conversion efficiency of greater than 95%.

Power Conversion Introduction

The general design goals for a transformerless power topology for power source inverters, typically found in the solar industry or other non-sinusoidal source industries, are generally identified as:

1. Maximum power point tracking to provide the maximum amount of power output by tracking the input voltage form the source. Typically, this is achieved by dynamically adjusting the input voltage by means of a boost stage at the input to smooth out periods of fluctuation.

2. High throughput efficiency of the power inverter in the order of >99%.

3. Low harmonic distortion.

4. Good electromagnetic compatibility (EMC) properties.

5. Surge capability to withstand output loads such as electric motor start-up.

6. Low leakage current for safety.

7. Paralleling capability.

8. Reliability—for example, 10 year lifetime.

There are a number of topologies that claim to meet the criteria above. One of these topologies is the Neutral Point Clamped (NPC) multilevel inverter. This inverter topology is understood to have little to no internal reactive power flow, a simple three level inverter output, and low leakage current. The NPC inverter topology will be used as one possible baseline topology to demonstrate the applicability of the invention. Of course, depending on design preference, other topologies may be used, understanding that the precepts of the invention, as described below, may be routinely adapted by one of ordinary skill in the art to accommodate these other topologies.

NPC Inverter Overview

The NPC inverter inherently works with a boost stage and can handle multiple DC power sources (e.g., arranged in parallel). It also has low harmonic distortion properties unlike other topologies that feature low frequency harmonics and zero current distortions. Reliability of this inverter type is also enhanced due to the stacked configuration of controllable inner and outer power semiconductor switches used to achieve the multilevel AC output waveform. Power semiconductor switches with a breakdown rating of 50% of the maximum DC-link voltage can be used, which increases the overall inverter efficiency through lower conduction and switching losses. This enhances the overall reliability through decreased component stress arising from thermal excursions and enhanced electromagnetic performance from the reduced dv/dt switching.

Also, its three level voltage levels per phase leg of $+V_{dc}/2$; 0 V; and $-V_{dc}/2$ achieve a smaller ripple current due to the inherent switching topology. It is interjected here that that power semiconductor switches with half the $BV_{dss}$ breakdown voltage can be used to offer better conduction and switching efficiency. Consequently, the current ripple can be made smaller to result in smaller filter components for ripple management.

FIG. 1 is a schematic diagram 100 of a related art NPC inverter circuit 40 with two DC-voltage sources/generators: $V_{dc1}$ (5) and $V_{dc2}$ (10), accompanied by individual upper and lower boost converter circuitry 15, 20. These components (and other associated components, as described below) are generally referred to according to their respective upper and lower configurations, that is, the upper set of components are described as DC-boost stage 1 (17) and the lower set of components are described as DC-boost stage 2 (18). It is understood that in some embodiments, more than two (2) stages may be utilized, according to design preference.

The mid-point 30 of the DC-Bus can be connected to the grid neutral to minimize the fluctuation between the DC voltage sources/generators 5, 10 and ground 35. This has the effect of minimizing leakage current in accordance with industry regulatory requirements. It is understood that the voltage at each DC-Bus capacitors C8 (32) and C9 (34) should be higher than the grid voltage amplitude at all times, to assert proper commutation of the NPC inverter circuit 40 which for this topology calls for the individual DC-boost "conversion" stages 17, 18.

The DC-boost conversion stages 17, 18 operate on the DC-voltage source/generator's DC input voltages, $V_{dc1}$ (5) and $V_{dc2}$ (10) with inductors L2 (7) and L3 (12), diodes D3 (9) and D2 (14) with their respective switches 15, 20, which are in line with the DC-Link voltages (positive 37 and negative 39) that supply the NPC inverter 40. Capacitors C5 (72), C6 (74), C7 (76), C8 (78), C9 (82) provide the appropriate matching and/or filtering for the voltages at the nodes, and diodes D6 (83) and D7 (85) provide the proper current flows between the AC generated and the AC Grid 90. Assorted resistances and other circuit elements are not illustrated for easier description, but may be instituted as needed.

The operation of the DC-to-AC conversion via the NPC inverter 40 is as follows. The upper switches FETD19 (42) and FETD17 (44), when switched by a Pulse Width Modulation (PWM) signal, produce the positive half of a manufactured AC-sine wave. Switch FETD17 (44) and mirror switch FETD18 (54) work in concert to produce a zero voltage step between the positive cycle and negative cycle of the manufactured AC-sine wave. The negative portion of the AC-sine wave is correspondingly produced by operating the lower switches FETD18 (54) and FETD20 (52) in a similar PWM mode. Proper "switching" of the four switches (42, 44, 52, 54) results in the production of a three level "stepped" AC sine waveform, as seen in FIG. 2C.

It should be noted that while the above example illustrates the switches to be denoted as FETDs (aka—field effect transistors with protection diodes), other types of transistors or switching devices that are suitable may be used, according to design preference.

Figure 2A:
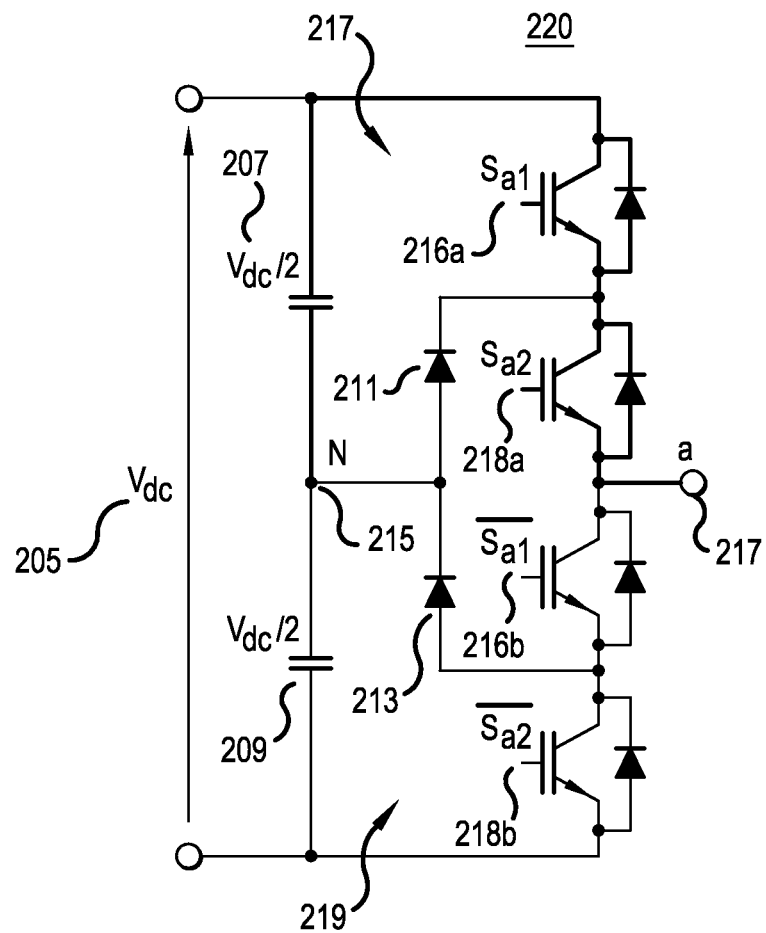
FIG. 2A is an illustration of a circuit schematic for a typical NPC inverter upper stage and lower stage.
Figure 2B:
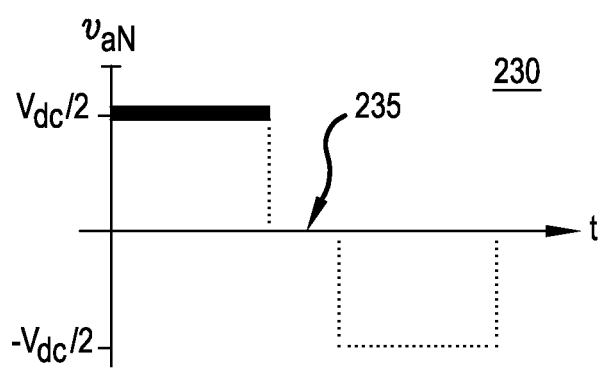
FIG. 2B is a time plot of the voltage between the NPC's output and neutral.
Figure 2C:
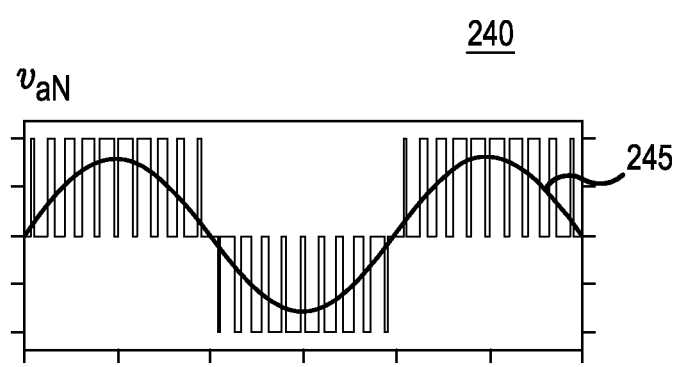
FIG. 2C is a time plot of the output voltages of the sequence of input voltages in FIG. 2B.

FIGS. 2A-C are illustrations showing a representative NPC inverter circuit 220 and the inputs 230 and outputs 240 of the NPC inverter circuit 220. FIG. 2A shows a circuit schematic with input voltage Vdc (205) split into its Vdc/2 components 207, 209 driving a typical NPC inverter upper stage 217 and lower stage 219, riding "neutral" node N 215. Upper diode 211 and lower diode 213 operate to bias the respective stages into the correct polarity (positive, negative). Switch inputs $S_{a1}$ (216a, 216b) and $S_{a2}$ (218a, 218b) are modulated, for example, via PWM, to trigger the associated transistors, with the output voltage $V_{aN}$ measured from output node "a" 217 to neutral node N 215.

FIG. 2B is a time plot 230 showing the voltage between the output "a" 217 and the neutral N 215, switching from $+V_{dc}/2$ to $-V_{dc}/2$ over a predetermined switching period, showing a "dead time" zero sequence 235 to avoid, and allow for, the transition between switches operating on the positive cycle and the change-over to those switches that will operate on the negative voltage cycle.

FIG. 2C is a time plot 240 showing the output voltages of the sequence of input voltages $V_{aN}$ seen in FIG. 2B, with modulation of the switches $S_{a1}$ (216a, 216b), $S_{a2}$ (218a, 218b), noting the complementary operator "–". Time averaging of the PWM modulated values results in the desired output AC sine wave 245 as seen in FIG. 2C.

Having outlined how a typical NPC inverted circuit operates, an exemplary modification of the typical NPC inverter circuit to provide enhanced power extraction for battery charging and/or high voltage output is now detailed.

Figure 3:
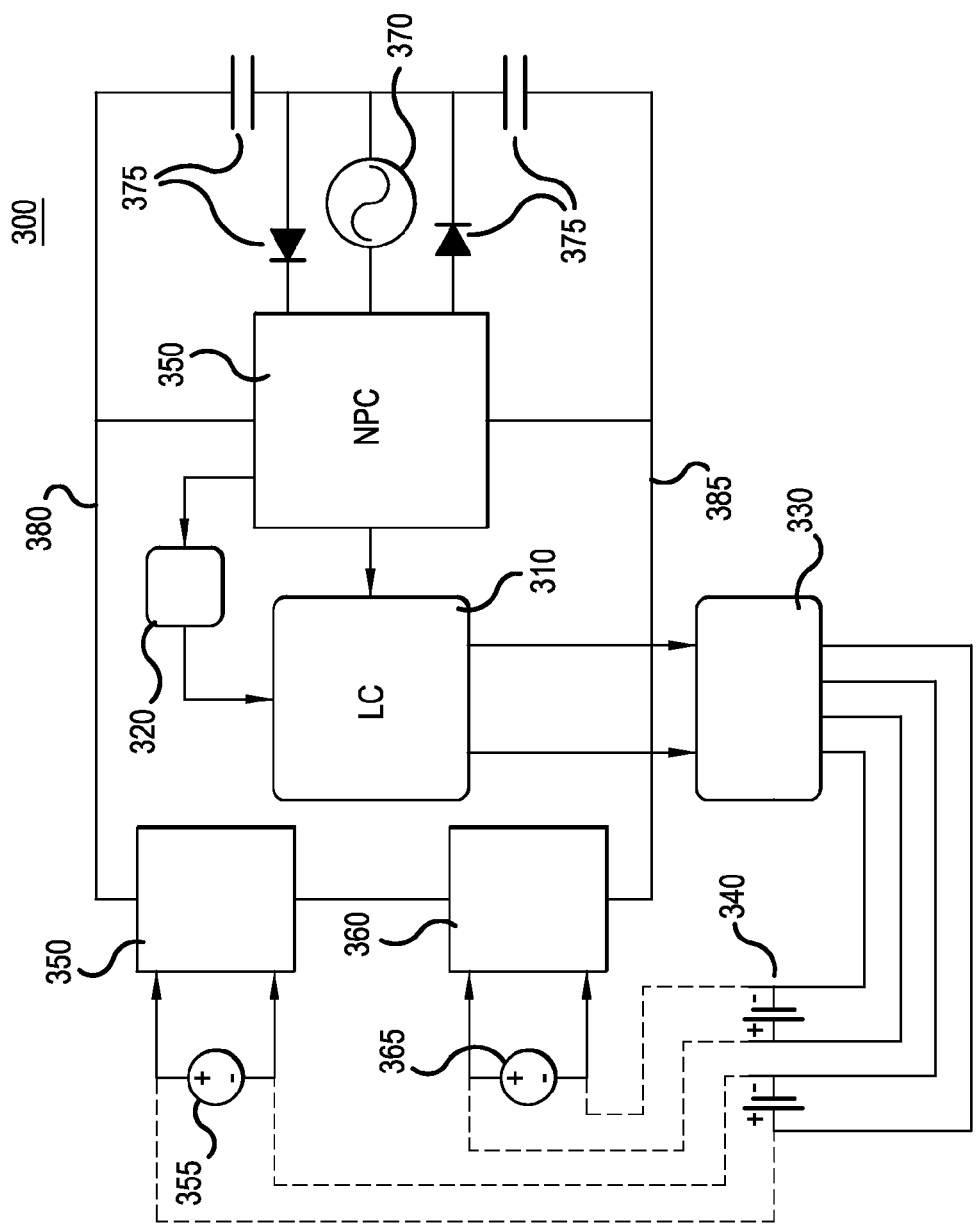
FIG. 3 is a block diagram of a typical DC-to-NPC configuration modified with an exemplary power enhancement system.

FIG. 3 is a block diagram 300 of a typical DC-to-NPC inverter configuration modified with an exemplary power enhancement system. The DC-to-NPC inverter configuration is modified with a resonator 310 "charged" by the NPC inverter 350 and is managed by a controller 320. The output of the resonator 310 is fed to a rectifier 330 for subsequent use. The controller 320 toggles the appropriate switches (e.g., FETDs) in the respective NPC inverter 350 and front end of the resonator 310 for appropriate voltage loading. Toggling is dependent on the mode of operation, as will be detailed below. Diodes and capacitors 375 filter the AC into half waves when there is no NPC switching and provide the clamping function while the NPC inverter 350 is operating.

In some embodiments, resonator 310 can be a simple tank circuit, for example an L-C circuit. In other embodiments, the resonator 310 may be a more involved circuit or series of circuits, or applicable resonant energy module, as understood by one of ordinary skill in the art. Accordingly, the "type" of resonator 310 may be selected according to design preference. The simplest resonator 310 can be a frequency tuned parallel L-C circuit responsive to amplitude modulation control.

In one embodiment, power to the resonator 310 arrives in the form of the AC variable gain voltage signal originating from the AC cycles, delivered by the respective inverter switches of NPC inverter 350. Accordingly, a voltage gain effect from the NPC inverter 350 and/or resonator 310 can be achieved.

In one embodiment, the constituent voltage is the AC-Grid supply 370 voltage and is operated by the DC-Link voltage 380, 385 through the respective switches of NPC inverter 350. In another embodiment, the power to the resonator 310 arrives from the DC source/generator 355, 365, wherein no AC-Grid supply 370 voltage is used. In another embodiment, a combination of the AC-Grid supply 370 voltage and DC source/generator 355, 365.

Power absorbed/generated by the resonator 310 is fed into the overall system via rectifier 330 to "charge" energy storage system 340. In some embodiments, the energy storage system 340 can be charged with a circuit (not shown) having a high operational frequency and zero voltage switching that is shared with the NPC inverter 350, resulting in reduced system weight.

Energy storage system 340 may be included in some embodiments, and may not be available in other embodiments, depending on design preference. When implemented, energy storage system 340 stores the energy captured by the resonator 310 and also serves as a backup to the DC source/generator's 355, 365 power. The later function is particularly germane in the event of insufficient generation of DC power from DC source/generator 355, 365. For example, if the DC source/generator 355, 365 is a solar array and during moments of low light or fluctuating sunlight, energy storage system 340 can be used as an DC energy source to drive the DC-Boost stages 350, 360. DC-Boost stage 1 (350) and 2 (360) are powered by DC source/generators 355 and 365, respectively, shown here as solar panel inputs.

While the above description has the DC source/generator 355, 365 shown as one or more solar arrays, is it expressly understood that other energy sources or generators that are non-solar in nature, which are capable of producing a DC-like output, can be substituted according to the energy harvesting paradigm utilized. Accordingly, various modifications and changes to the power source/generator and other elements of the exemplary embodiments may be made by one of ordinary skill in the art, without departing from the spirit and scope of this disclosure. For example, there may be a case where the power source is alternating in nature, but is rectified to output a DC current, which is then operated upon by the modifications described above.

The addition of the above modifications to a typical DC-to-NPC inverter configuration increases the overall efficiency of a stand-alone DC-to-NPC inverter system. It also allows for the maximization of harvesting power that is already available and also using this as recoverable energy to feed into parasitic loads—in the case of stand-alone operation—and also permits several alternative modes of operation.

Figure 4:
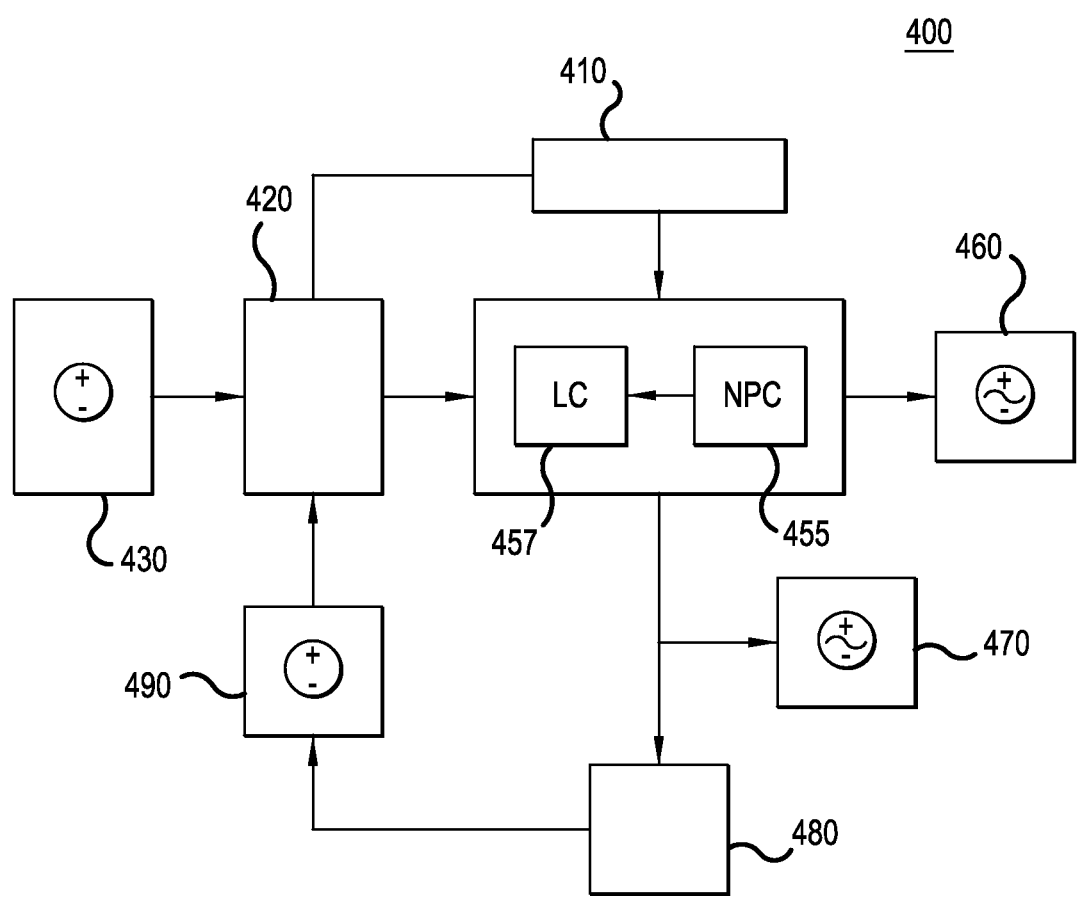
FIG. 4 is a block diagram illustrating another embodiment.

FIG. 4 is a block diagram 400 illustrating another embodiment with a controller 410 also controlling the boost stages 420; and output of the resonator 457 and NPC inverter 455, tapped for high voltage AC output 470. Similar features as seen in FIG. 3 are represented here by DC source(s) 430, DC-Boost stage(s) 420, AC-Grid supply 460, rectifier 480 and rechargeable battery 490. The interconnection of the various features are understood to be self-evident and elaboration of their operation will be further detailed below.

Modified NPC Inverter—Operational Modes

There are several operational modes associated with a resonant "tank" and supporting rechargeable "battery" system that arise from the combination of NPC inverter architecture, the variety of input stimulus selected for operation, and their condition. However, before proceeding, it should be understood that while the embodiments described herein are in the context of an NPC inverter having characteristics derived from FIG. 1, other NPC inverters having different circuit configurations (or characteristics) may be modified by one of ordinary skill in the art to arrive at similar performance characteristics. Therefore, it is expressly understood that the invention is not limited to the NPC inverter configuration(s) shown.

The several modes of operation are represented by the following scenarios:

1. AC Grid Supply voltage with no NPC inverter switching.
2. AC Grid Supply voltage with "outer" NPC inverter actively switching.
3. No AC Grid Supply voltage with all NPC inverters actively switching (e.g., standard DC-to-AC NPC inverter operation).

Figure 5A:
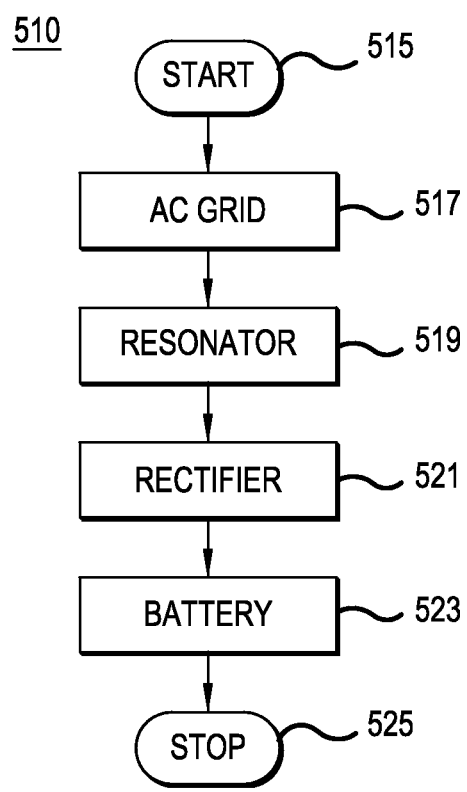
FIG. 5A is a flow chart of an embodiment when no inverter switches are operational and energy from the AC Grid is used as the source power.
Figure 5B:
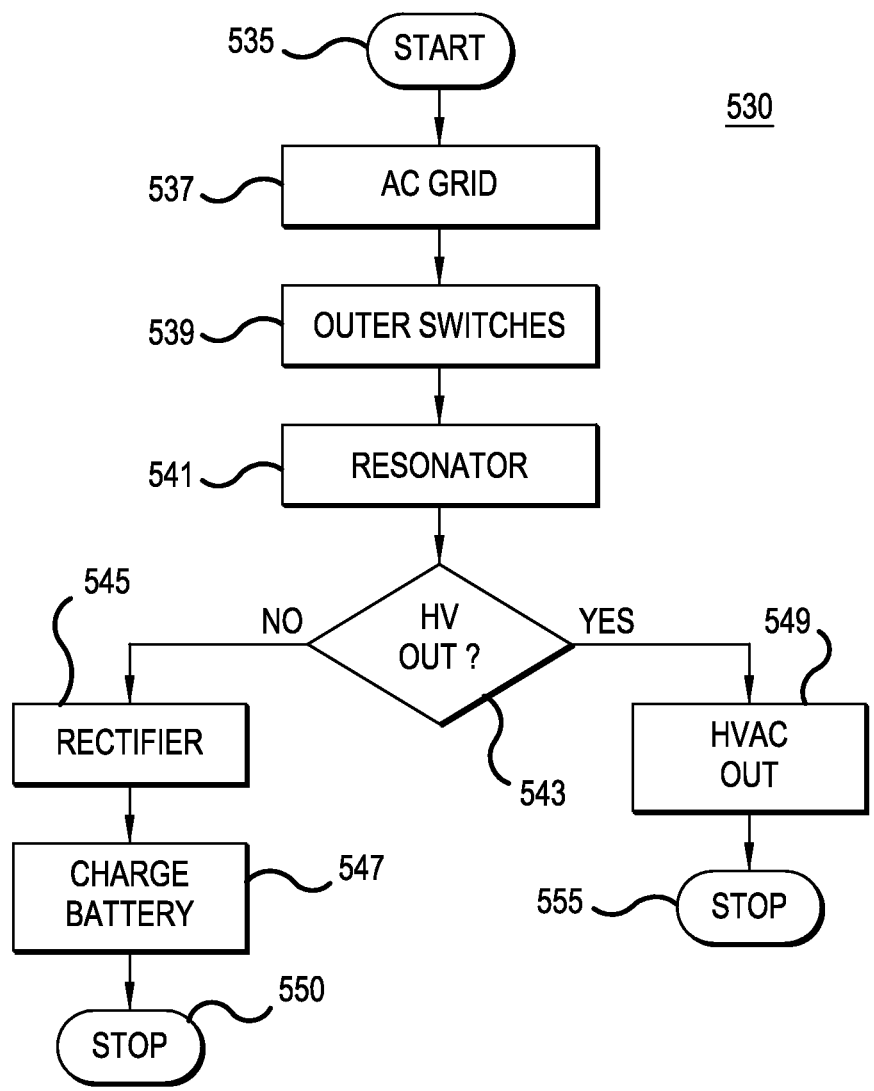
FIG. 5B is a flow chart of an embodiment when AC Grid Supply voltage is used as the source power but fed through "outer" NPC inverter switches.
Figure 5C:
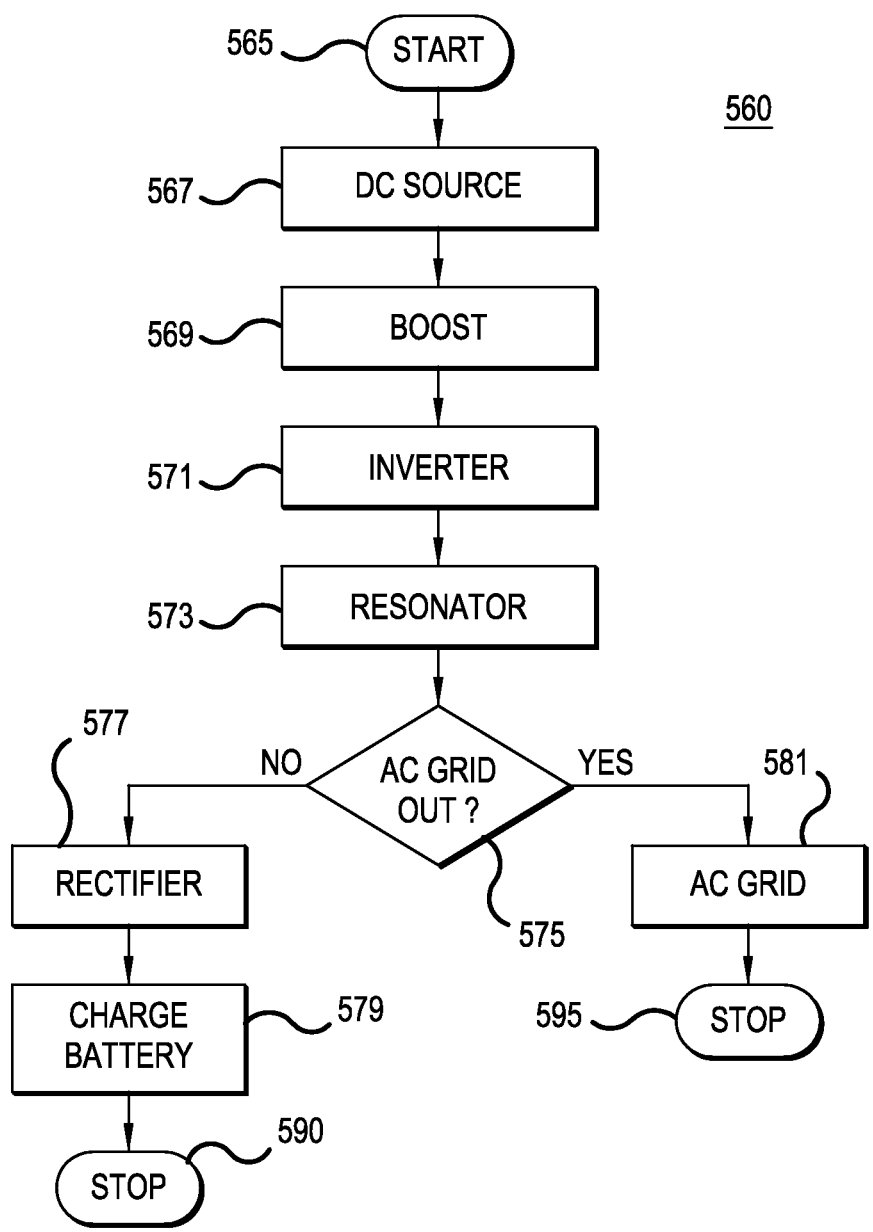
FIG. 5C is a flow chart of an embodiment when no AC Grid voltage supply is used and power originates from the DC input source.

The operation of these modes will be explained with reference to FIGS. 5A-C, FIGS. 5A-C, which illustrate the mode-based power flow through the various devices shown in the block diagram of FIG. 4. It should be noted that while the following examples illustrate the switches to be denoted as FETDs (aka—field effect transistors with protection diodes), other types of transistors or switching devices that are suitable may be used, according to design preference. For example, in some embodiments insulated gate bipolar transistors (IGBTs) may be used.

Scenario 1—No inverter switches are operational and energy from the AC Grid is used as the source power. Referring to the block diagram of FIG. 4 and the flow path shown in FIG. 5A, the flow 510 of power starts 515 with AC Grid Supply 460, 571 being routed to resonator 457, 519 (bypassing shut off switches of the NPC inverter 455), the output of which is fed to rectifier 480, 521. The rectified AC-DC voltage is forwarded to charge battery 490, 523, whereupon the process is completed 525. The result is the use of the AC Grid for battery charging 490, 523, but channeled through the resonator 457, 519 to generate "amplified" DC voltage via the rectifier 489, 521.

As alluded above, controller 410 "controls" the voltage seen at the input of the resonator 457, 519 via appropriate opening/closing of channels and/or switches. Also, the battery charging can be facilitated by a battery management system (not shown) which can be responsible for the determination of battery health and, in some embodiments, can be used to determine the amount of power fed into the battery 490, 523.

Scenario 2—AC Grid Supply voltage is used as the source power but fed through "outer" NPC inverter switches resulting in a high voltage output. The process 530 starts with the AC Grid 460, 537, power is channeled to the outer inverter switches 539 of the NPC inverter 455. The "inner" NPC inverter switches can be operated under PWM with zero voltage crossing to provide null state lower losses. The combination of only operating the upper and lower switches, results in two "sine" waveforms that are in-phase and of equal voltage amplitude. They are combined and added at the input of the resonator 457, 541 to produce a high voltage (HV) AC input signal to the resonant tank representing twice the amplitude of the AC-Grid voltage 470.

Decision logic 543 (or an operator managed tap of the line, or via controller 410) can decide if the HV AC output is externally used or fed to rectifier 480, 545. If logic 543 decides for HV AC output 470, 549 then it is so configured and stops 555. The HV AC output 470, 549 could be utilized for AC loads that require higher AC voltage operation than the input AC Grid voltage. If logic 543 decides for battery charging, then the HV AC is forwarded to rectifier 480, 545 and the rectified output is used to charge battery 490, 547, whereupon the process stops 550. As mentioned above, controller 410 can be connected to various elements of the system to control their operation, including whether HV AC is output or used for rectification.

Scenario 3—No AC Grid voltage supply and power originates from the DC input sources (e.g., solar panels). The process 560 starts 565 with DC source(s) 430, 567, which is channeled through the DC-boost stage(s) 420, 569, the DC-boosted voltage is forwarded to the NPC inverter 455, 571 and with all NPC switches operating, the AC created output from the NPC inverter 455, 571 is fed to resonator 457, 573. From the resonator 457, 573, a decision logic 575 (e.g., controller 410) can decide if the "resonated" voltage will be used to charge a battery or output to the AC Grid. If the logic 575 decides the former, then the resonated voltage is forwarded to rectifier 480, 577, the AC-DC converted voltage being then forwarded to battery 490, 579 for charging, whereupon the process stops 590. If the logic 575 decides the latter, then the resonated voltage being AC in form will be sent to the AC Grid 470, 581 whereupon the process stops 595.

Figure 6:
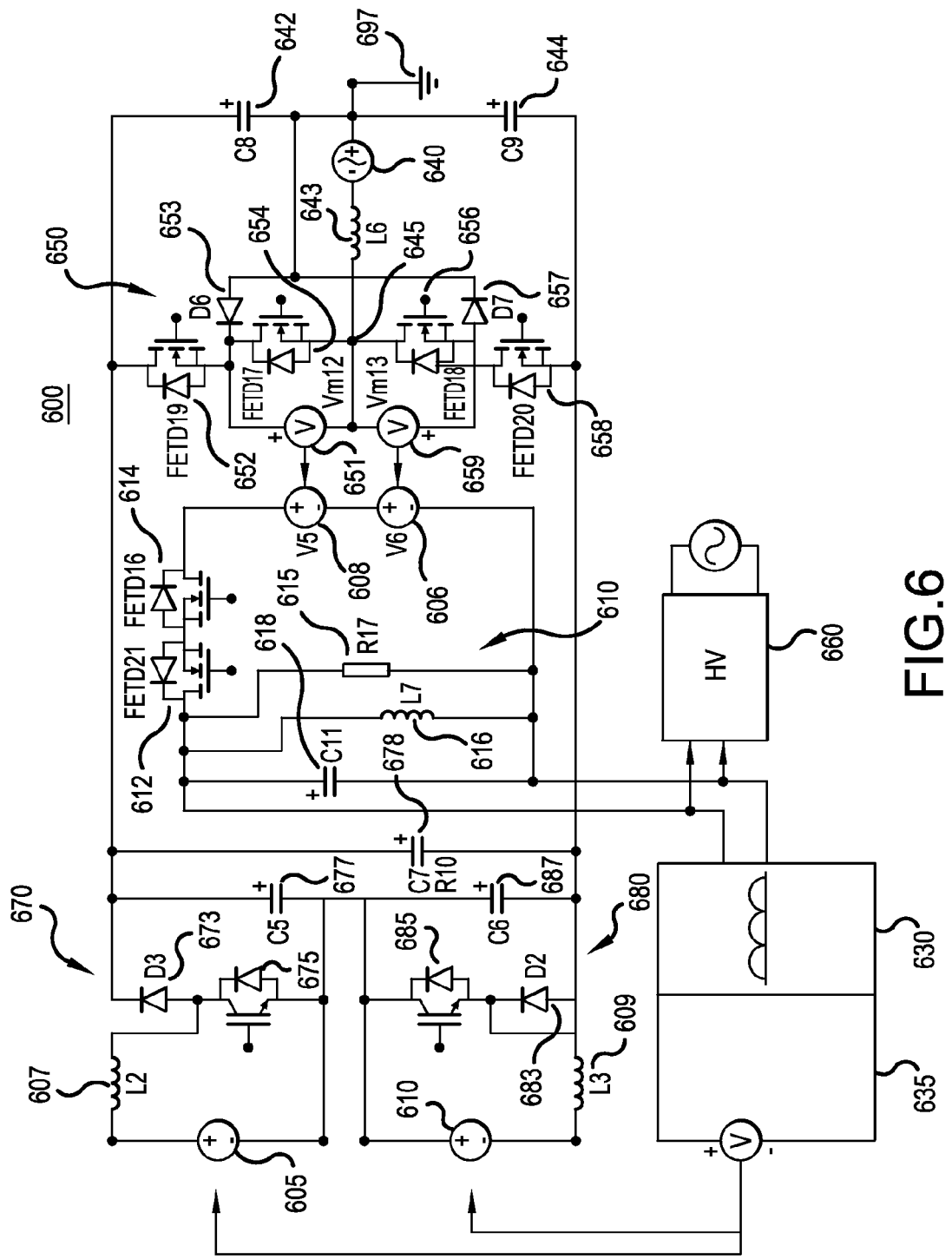
FIG. 6 is a circuit schematic of an embodiment configured for multiple mode operation.

FIG. 6 is a circuit schematic 600 of an embodiment configured for operation under the three modes described above. DC sources/generators 605, 610 are coupled via inductors L2 (607), L3 (609) to DC-boost stages 670, 680, respectively. Diodes D3 (673), D2 (683) channel output of the controlled boost transistors 675, 685, respectively, to NPC inverter 650, via stage specific capacitors C5 (677), C6 (687) and aggregate stage capacitor C7 (678).

Input to NPC inverter 650 is split to AC Grid supply 640 ground 647 by DC-bus capacitors C8 (642), C9 (644) which also feed into diodes D6 (653), D7 (657) acting as inner FETD bypass diodes. AC Grid supply 640 is coupled to common point 645 between the inner FETD17 (654), FETD18 (656), being at the center of the arrangement of inner and outer FETDs (654, 656, 652, 658). The inner and outer FETDs (654, 656, 652, 658) are controlled by an external controller (not shown) which provides the appropriate PWM switching signals.

Output of the upper stage of the FETDs is represented by voltage Vm12 (651) and the lower stage of the FETDs by voltage Vm13 (659), which are input into boost & buck circuit of resonator 610 as voltages V5 (608), V6 (606). The individual voltages V5 (608), V6 (606) can be essentially doubled through the polarity inversion of one of the voltages and combining them to result in the doubling of the output voltage. Therefore, if V5 (608)=V6 (606), then V5 (608)+V6 (606)=2 times V5 (608) (or V6 (606)).

The "doubled" voltage is fed to controllable switches FETD21 (612) and FETD16 (614) which are series connected in opposite polarity to provide a bi-directional switch arrangement. The controllable FETD21 (612), FETD16 (614) operate as bi-directional switches to the parallel resonant L-C circuit of L7 (616) and C11 (618). Input resistor R17 (615) bridges the parallel resonant L-C circuit (sometimes called a tank circuit or resonant tank). The output voltage control of the resonant tank is achieved by changing the duty cycle of FETD21 (612) and FETD16 (614) to realize a boosted voltage, or a reduced voltage, corresponding to the input voltage applied to the resonant tank circuit. In one example, a PWM frequency of 30 kHz (or multiple thereof), matched with the appropriate inductor L7 (616) of 7 pH and capacitor C11 (618) of 4 µF, for parallel resonance was chosen.

Of course, other frequencies (and associated matching resonant elements) that are compatible with the applicable "grid" supply frequency may be utilized in the above embodiments. For example, in some countries the grid supply frequency is 50 Hz and therefore the appropriate half frequency of 25 kHz (or a multiple thereof) may be used. Further, while the "grid" supply is implicitly understood to be the household/industrial power supplied by a commercial utility, other non-commercial supplies could also operate as the external supply. For example, a specialized power system (e.g., exploratory base, vessel, space ship, etc.) may have a different frequency and therefore the respective elements of an applicable embodiment may be reconfigured to match the frequency of the specialized power system.

Similarly, the grid supply may be of a different voltage than conventionally used and therefore, it may be of a different value without departing from the spirit and scope of this disclosure.

Output of the resonator 610 is fed to DC rectifier 630, having intervening connections for HV AC output 660. Output of the rectifier 630 is connected to a battery 635 for charging, which is connected to the input of the boost circuits 670, 680. A battery charging management system (not shown) may be a part of the rectifier 630 and battery 635 configuration. In some embodiments, system controller (not shown) may operate as the battery charging management system.

With reference to the above circuit, for Scenario 1, where no inverter switches are operational and energy from the AC Grid is used as the source power to charge the battery, power first comes from the AC Grid supply 640, being commuted through diodes of FETD17 (654), FETD18 (656), FETD19 (652), FETD20 (658) and D6 (653), D7 (657), so as to be represented as voltage from Vm12 (651) and Vm13 (659), which become voltages V5 (608), V6 (606) at the input of the resonator 610. Bi-directional switches FETD21 (612) and FETD16 (614) are modulated by duty cycle and PWM to feed the V5 (608), V6 (606) voltages to the parallel resonant L-C circuit L7 (616) and C11 (618). System controller (not shown) is tasked with providing the appropriate control input signals for managing the switching of FETD21 (612) and FETD16 (614) and maintaining the non-operational status of the NPC inverter's 650 FETD17 (654), FETD18 (656), FETD19 (652), FETD20 (658).

The control input signals govern the output of the AC voltage from resonator 610, which in turn correspond to the input of the rectifier 630 which is fed to battery 635.

For Scenario 2, where AC Grid Supply voltage is used as the source power but fed through "outer" NPC inverter switches, power first comes from the AC Grid supply 640. This mode combines the network of components to include the DC-bus capacitors C8 (642), C9 (644) and diodes D6 (653), D7 (657) which become back biased and switches FETD19 (652), FETD20 (658) commutate complementary sine waveforms that are in phase is of equal voltage amplitude. The upper FETD19 (652) and lower FETD20 (658) switches are commuted with a PWM strategy to achieve a suitable fundamental frequency, such as 60 Hz under duty cycle control.

The resulting voltage from Vm12 (651) and Vm13 (659) become voltages V5 (608), V6 (606) at the input of the resonator 610, which due to the polarity are summed. A double amplitude constant "sine" wave is therefore input into the resonator 610. Bi-directional switches FETD21 (612) and FETD16 (614) are modulated by duty cycle and PWM to pulse the V5 (608), V6 (606) voltages to the parallel resonant L-C circuit L7 (616) and C11 (618). Accordingly, the corresponding output from the resonator 610 can be adjusted by the modulation duty cycle control to provide a wide range of AC output voltage, e.g., a boosted voltage, or a bucked voltage, and, if DC sources/generators 605, 610 are operational (e.g., solar panels are generating), then boost voltage from the DC sources/generators can be added. Some simulations have shown that for Scenario 2, the voltage envelope from the output of the resonator 610 will have an impressed frequency that is approximately twice the AC Grid supply frequency. System controller (not shown) is tasked with providing the appropriate control input signals for managing the switching of FETD21 (612) and FETD16 (614) and maintaining the switching status of the NPC inverter's 650 outer switches FETD19 (652), FETD20 (658).

Output of the resonator 610 can be harvested by HV AC output 660 (for example, to power a motor, etc.) or directed to rectifier 630 to battery 635 for charging.

For Scenario 3, there is no AC Grid voltage supply and power originates from the DC sources/generators 605, 610 which represents the "normal" power generation operation. The DC generated power from DC sources/generators 605, 610 is channeled through inductors L2 (607), L3 (609) to DC-boost stages 670, 680, respectively. Diodes D3 (673), D2 (683) channel output of the boost transistors 675, 685, respectively, to NPC inverter 650, via stage specific capacitors C5 (677), C6 (687) and aggregate stage capacitor C7 (678).

PWM pulsing of NPC inverter's 650 FETD17 (654), FETD18 (656), FETD19 (652), FETD20 (658) convert the input DC voltage into a generated AC voltage seen at NPC inverter's 610 voltage nodes of Vm12 (651) and Vm13 (659). The generated AC voltage seen at NPC inverter's 610 voltage nodes of Vm12 (651) and Vm13 (659) is available to the AC Grid supply as a compatible AC signal via common point 645. These node voltages also become voltages V5 (608), V6 (606) which are added to result in a higher AC voltage at the input of the resonator 610.

Bi-directional switches FETD21 (612) and FETD16 (614), which are modulated by duty cycle and PWM, feed the added V5 (608), V6 (606) voltages to the parallel resonant L-C circuit L7 (616) and C11 (618) which is further amplified. The corresponding amplified output of the resonator 610 can be harvested by HV AC output 660 (for example, to power a motor, etc.) or directed to rectifier 630 to battery 635 for charging.

Irrespective of the mode or scenario of operation, the resonator's 610 output can be dependent upon the level of DC voltage applied to the input of DC-boost stages 670, 680 and the gain ratio of the boost stages themselves. Also, another limiting factor is the capability of the power semiconductor/switches in the NPC inverter 650 with regard to upper breakdown voltage.

As noted above, HV AC output from the resonator 610 can be adjusted by adjusting the modulation/duty cycle or other relevant parameter via a system controller (not shown). System controller is tasked with controlling the operation of boost transistors 675, 685 in the DC-boost stages 670, 680, the NPC inverter's 650 FETD17 (654), FETD18 (656), FETD19 (652), FETD20 (658), and resonator 610 input switches FETD21 (612) and FETD16 (614). In some embodiments, system controller can be also control the decision logic/switching of HV AC output and/or management of the battery charging procedure (e.g., output of rectifier 630).

In some embodiments, the output of the resonator 610 may be controlled in accordance to performance parameters/condition of an individual component of the system or to an aggregate performance parameter/condition of the overall system. For example, if the voltage of battery 635 is increased as a result of charging from the rectifier 630, the corresponding DC input can be reduced by selective control from the system controller, thus avoiding unnecessary over charging of the battery 635.

It is understood that the circuit schematic of the embodiment of FIG. 6 is a representative embodiment and having understood the aspects of the embodiment, numerous modifications to the design may be made. For example, inductors L2 (607) and L3 (609) may be replaced by different filtering elements (e.g., shunting elements); the parallel resonant L-C circuit L7 (616) and C11 (618) could be reconfigured as a series resonant circuit; resistors, capacitors, inductors may be added/removed for proper balancing; location, arrangement, the type of various switches may be made; feedback to the system controller can be instituted, multiple (e.g., parallel/series stages) of the NPC inverter 650 and boost stages 670, 680 could be implemented, and so forth. Therefore, it is understood that this embodiment is not limited to the circuit schematic shown in FIG. 6 and that various modifications, changes, improvements and circuit alterations that are in the purview of one of ordinary skill in the art may be made without departing from the scope of this disclosure.

As other examples, techniques such as Zero Voltage Closing (ZVC) switching can be used to assist efficiency goals. In some experimental trials, transformer isolation was also included to increase power integrity and quality. Further, high frequency operation of the resonator 610 could be implemented to reduce passive component volume.

Figure 7:
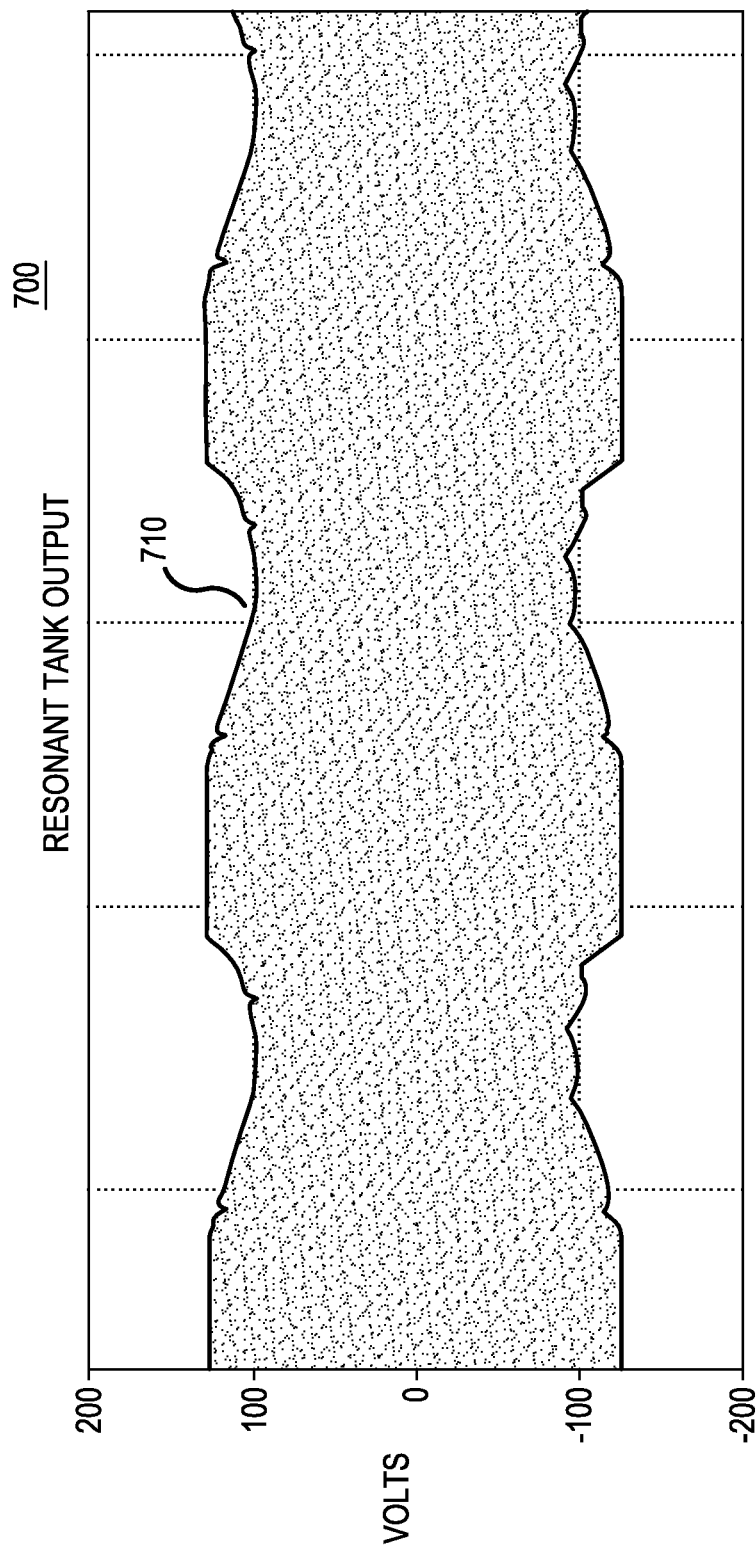
FIG. 7 is a plot of the simulated output of the resonant circuit in an embodiment of FIG. 6.

FIG. 7 is a plot 700 of the simulated output of the resonant circuit in an embodiment operating in a Scenario 2 mode. A simulation run was performed on the circuit of FIG. 6 and the output voltage envelope 710 from the resonant circuit was plotted over a time period of approximately 25 ms. The AC grid supply voltage was set at 208 V peak-to-peak and mode 2 inverter operation was instituted. The resonant circuit output voltage envelope 710 was found to be composed of a high fidelity waveform composed of 30 kHz pulses with a fundamental frequency envelope that is twice the AC-Grid frequency of 60 Hz. The 30 kHz pulses were chosen to facilitate high quality DC rectification. As seen, the amplitude of the envelope 710 of the waveform varies slightly around the +100 V and −100 V ranges.

It should be understood that in different modes of operation, the amplitude of the output voltage envelope 710 from the resonant circuit can be altered. For example, in the circuit of FIG. 6, in the mode with AC Grid supply voltage and no NPC inverter switching (i.e., Scenario 1 operation), the minimum output voltage from the resonant circuit can be taken down to 26V RMS. Alternatively, with precise control of the various switches, with no AC Grid and only outer inverter switches operating, the maximum voltage output of the resonant circuit can reach 330V RMS. In Scenario 3 mode, the output of the resonant circuit is directly associated to the level of DC input from either the DC source/generator (e.g., solar panels) or battery. As one example, where a 48 V battery source is applied to the DC input and the DC-DC boost is in operation, the resonant tank output can reach 350V RMS.

It is understood that these values are simply representative of the possible ranges for the given configuration of FIG. 6 and may vary depending on the configuration chosen.

The following discussion describes a variation of the above embodiments to create a multi-phase, multi-level NPC inverter with increased functionalities, such as:
  i) Higher power operation with increased fidelity in the resonant tank waveforms.
  ii) Increased inverter efficiency through phase load sharing and thermal balancing.
  iii) Improved EMC emissions.
  iv) Enhanced grid-tie operability through the use of a three-phase NPC configuration.
  v) Lower device stress in the AC to DC rectification process in the post circuitry following the resonant tank.

Of particular applicability, as one example, is for solar power applications typically above ~>10 kW, which usually use a three phase-leg topology. This is done to arbitrate power between the phases and to manage waveform fidelity. It is also a norm for the utility grid and has many references for grid-tie operation via generic solar power inverters.

Figure 8:
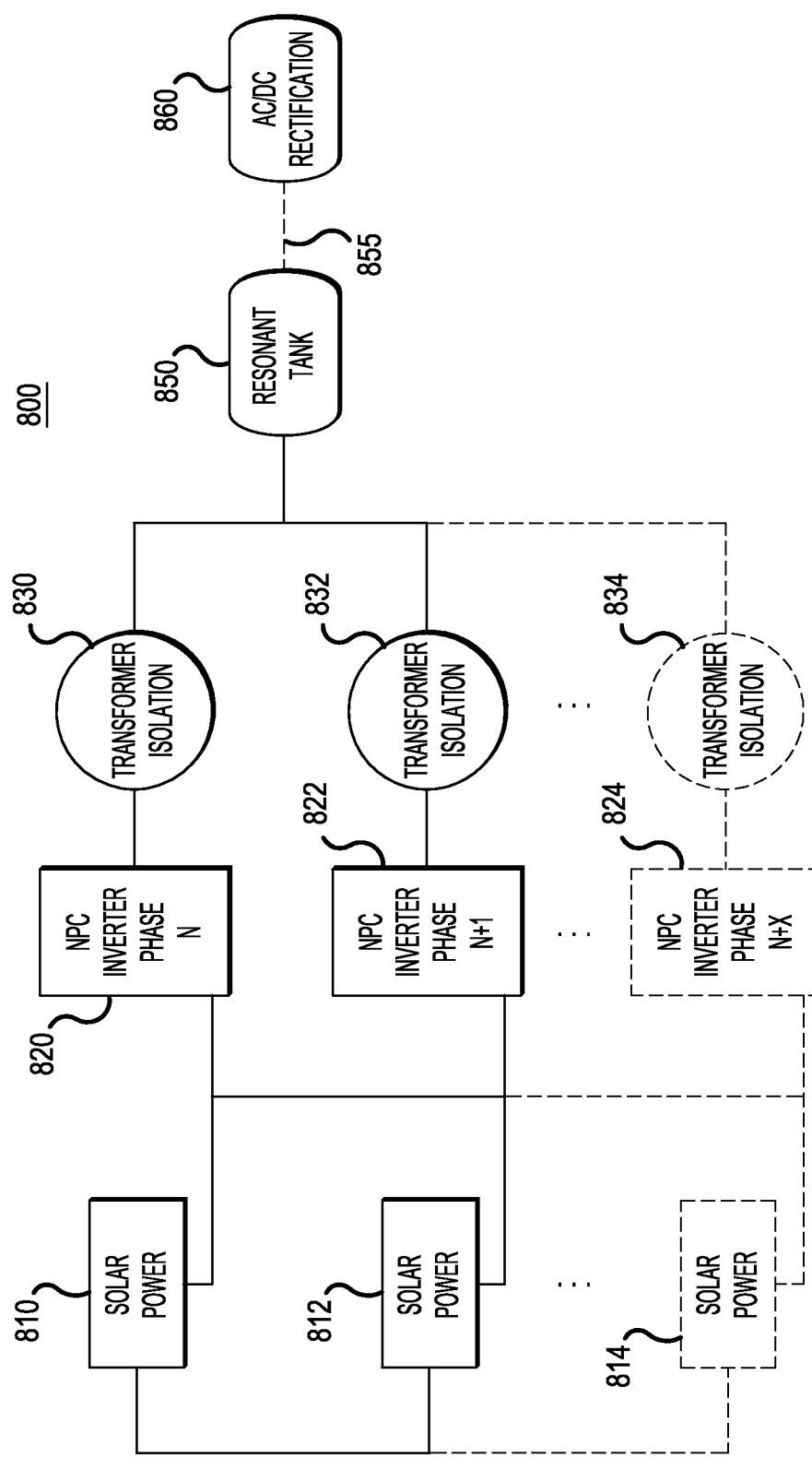
FIG. 8 is a block diagram of a multi-phase embodiment.

FIG. 8 is a block diagram extrapolation 800 of various embodiments described above, wherein the multi-level NPC inverters are staged to form a multi-phase topology, generalized in this Fig. to N, N+1, . . . N+X. The DC power sources (in this example, solar) 810, 812, 814 feed respectively the associated NPC inverter phase legs 820, 822, 824. Each phase has an isolating transformer stage 830, 832, 834, with an individual matrix switch set (not shown). It can be seen that multi-phasing capability is acquired by simply "adding" another single phase system into the original single phase system. Thus, differently phased systems can be easily tiered together. The outputs of the respective phases are fed into the common resonant tank 850 and optionally forwarded 855 to the respective AC/DC rectification circuit 860.

Figure 9:
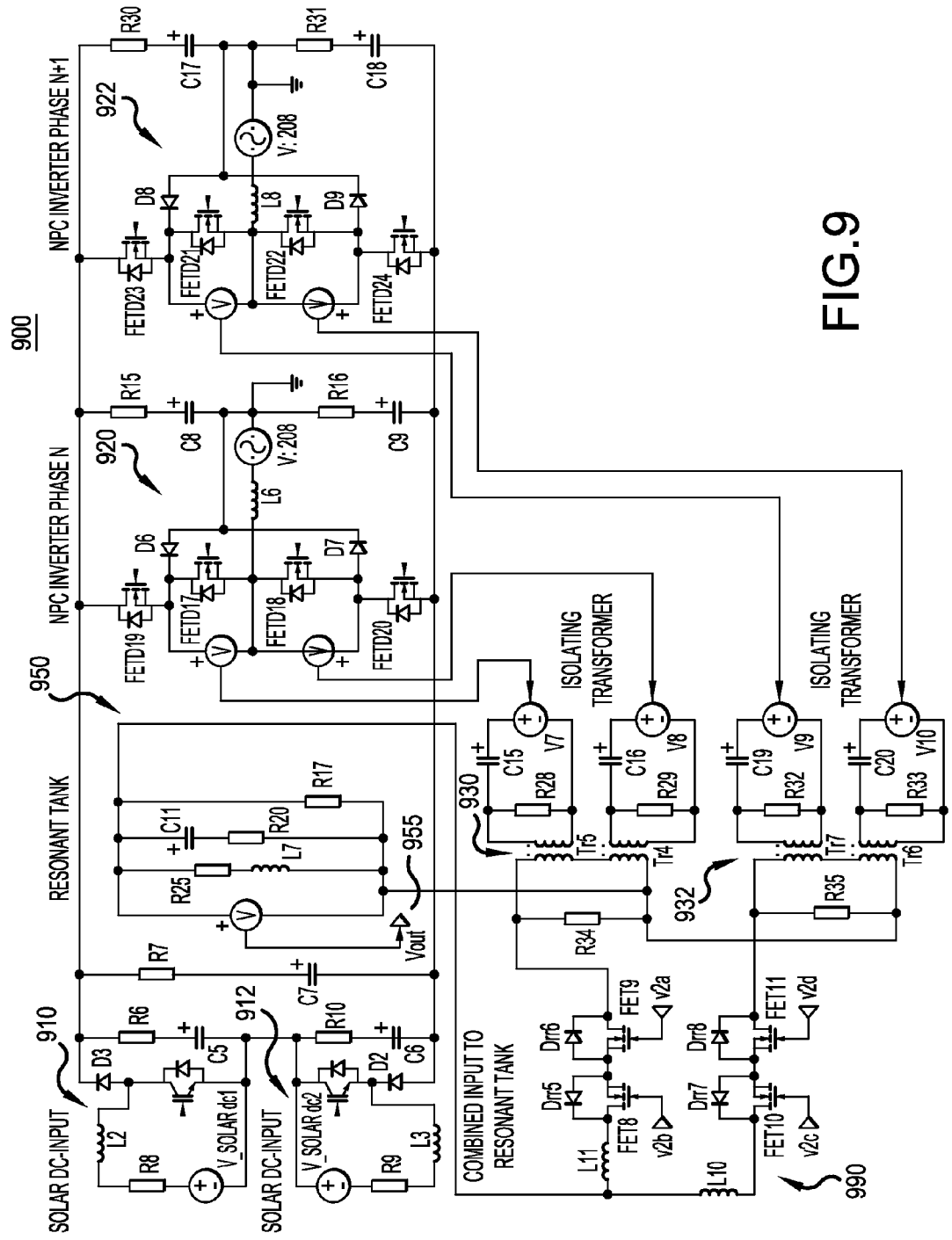
FIG. 9 is a schematic diagram of a multi-phase embodiment.

FIG. 9 is a schematic representation 900 of the multi-phase embodiment of FIG. 8, showing only the first two legs. DC input stages 910, 912 with associated DC-boost circuitry are fed to exemplary NPC inverter phases 920, 922, having attributes similar to those discussed above. The outputs of the inverter phases 920, 922 are fed into phase isolation transformer stages 930, 932, which are coupled to controlled phase matrix switches 990, the combined outputs of which are fed to resonant tank 950. The output Vout of the resonant tank 950 is provided to a rectifier, AC supply, battery, load, etc. (not shown). Output to the resonant tank 950 is via modulation control of the voltages v2a, v2b, v2c, and v2d into FETs9-11 of the phase matrix switches 990. Various FETs and/or switches for each boost and inverter phase in FIG. 9 are understood to be under switching modulation schemes consistent with a single phase system, having appropriate time delays. It should be understood that various passive and/or active elements of FIG. 9 may be removed, altered, added to afford the same effective result. For example, some of the resistors, inductors, capacitors may be changed or located at a different section of the circuit, while providing similar or equivalent results.

It is important to recognize the time delay effects from multi-phasing. Specifically, the periodic variance between the phases gives rise to the need for different switching sequences as the zero-crossover for each phase is displaced. There also can be overlap between the three AC phases that are displaced by 120 degrees. In this instance, improvement in power distribution and efficiency in rectification can be obtained by using the overlap. That is, a "normalization" of the AC waveform is achieved prior to entering the resonant tank, thereby "smoothing" the waveform to reduce current ripple in the AC to DC post processing stage. In other words, the undulation of the AC waveform envelope entering the resonant tank would be reduced. Therefore, in addition to facilitating N+1 phase systems, the exemplary system's AC waveform would be of higher fidelity than in a single phase system.

The embodiments described above demonstrate the ability to easily increase the efficiency of a typical, multi-phase DC-AC inverter system, by "adding" a resonator and associated controlling systems. Further, by use of the resonator with a switched mode, the output of the resonator can be twice the AC input, thus operating as a transformerless step-up transformer. The ability to operate various embodiments in multiple modes, allows degrees of flexibility not known in the prior art.

It should be noted that a system controller may be integrated into overall system or separate, being a computer or processing device under software operation. Therefore, as will be appreciated by one skilled in the art, the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

The foregoing is illustrative only and is not intended to be in any way limiting. Reference is made to the accompanying drawings, which form a part hereof. In the drawings, similar symbols typically identify similar components, unless context dictates otherwise.

Note that the functional blocks, methods, devices and systems described in the present disclosure may be integrated or divided into different combinations of systems, devices, and functional blocks, as would be known to those skilled in the art.

In general, it should be understood that the circuits described herein may be implemented in hardware using integrated circuit development technologies, or via some other methods, or the combination of hardware and software objects could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A multi-phase, power conversion device, comprising:
   a plurality of multi-level inverter phases, each inverter phase comprising:
   a DC-boost circuit configured to receive input power from a DC generating source;
   a power inverter coupled to an output of the DC-boost circuit and to an AC grid supply, having a plurality of power conversion switches arranged in a stacked configuration having controllable inner and outer switches;
   at least one output voltage from the power inverter, conveying:
   in an non-inverting switched mode, an AC voltage from power from the AC grid supply;
   in an inverting outer switched mode, an AC voltage from power from the AC grid supply; and
   in an inverting outer and inner switched mode, an AC inverted voltage from DC power boosted by the DC-boost circuit;
   at least one of an input switch and output to the AC grid supply, coupled to the at least one output voltage from the power inverter;
   a resonant circuit coupled to at least one input switch of each power inverter and configured for power amplification according to a resonant frequency operation of the input switches;
   at least one of a rectifier and high voltage AC output tap coupled to an output of the resonant circuit; and
   a controller coupled to the power conversion switches of the plurality of inverter phases and to the input switches.

2. The device of claim 1, further comprising a rechargeable battery coupled to an output of the rectifier.

3. The device of claim 1, wherein the inverters are a neutral point clamped (NPC) inverter and the power conversion switches are at least one of field effect transistors (FETs) and Insulated Gate Bipolar Transistors (IGBT).

4. The device of claim 3, wherein the output voltages of the power inverters share a common node at a center of the stacked plurality of power conversion switches.

5. The device of claim 1, wherein the DC-boost circuits are a multi-stage DC-boost circuit, each stage being configured to receive power from an individual DC generating source.

6. The device of claim 1, wherein the input switches are a series connection of a pair of oppositely directly FETDs.

7. The device of claim 1, wherein the resonant circuit is a frequency tuned parallel L-C circuit sensitive to amplitude modulation control.

8. The device of claim 2, wherein the DC power sources are coupled to the inputs of the DC-boost circuits.

9. The device of claim 8, wherein the DC power sources are solar panels.

10. The device of claim 8, wherein the DC power sources are a plurality of solar panels and each inverter phase generates power that is approximately 120 degrees in separation representing a three phase system operation.

11. The device of claim 2, wherein an output of the rechargeable battery is input into the DC-boost circuits.

12. The device of claim 1, wherein at least one of the power conversion switches and input switches are controlled by a pulse width modulation (PWM) signal from the controller.

13. The device of claim 12, wherein at a duty cycle of the PWM signal is varied to achieve amplitude modulation.

14. The device of claim 12, wherein a frequency of the PWM signal is at least one of 30 kHz, 60 kHz, 25 kHz and 50 kHz.

15. The device of claim 2, wherein the at least one output voltage from the power inverters is measured from a junction between an inner and outer switch and from the common node.

16. The device of claim 1, wherein in an inverting outer switched mode, one of two output voltages from the power inverters is subjected to inversion to positively combine output voltages from the power inverters, resulting in a doubling of the output voltage.

17. A method for power conversion, comprising:
   forming a multi-level/multi-phase system by joining a plurality of inverters phases, each inverter phase comprised by:
   configuring a DC-boost circuit to receive input power from a DC generating source;
   coupling a power inverter to an output of the DC-boost circuit and to an AC grid supply, the power inverter having a plurality of power conversion switches arranged in a stacked configuration having controllable inner and outer switches;
   conveying at least one output voltage from the power inverter, when:
   in an non-inverting switched mode, conveying an AC voltage from power from the AC grid supply;
   in an inverting outer switched mode, conveying an AC voltage from power from the AC grid supply; and
   in an inverting outer and inner switched mode, conveying an AC inverted voltage from DC power boosted by the DC-boost circuit;
   coupling at least one of a input switch and output switch to the AC grid supply to the at least one output voltage from the power inverters;

coupling a resonant circuit to each power inverter's input switch, the resonant circuit being configured for power amplification according to a resonant frequency operation of the input switch and input power;
coupling at least one of a rectifier and high voltage AC output tap to an output of the resonant circuit;
coupling a controller to the power conversion switches of the inverter phases and to the input switches; and
operating the controller to provide a PWM signal to at least one of the power conversion switches and input switches, according to a selected switched mode, to output a converted input power.

18. The method of claim 17, further comprising feeding the DC power sources with a plurality of solar panels, wherein each inverter phase generates power that is approximately 120 degrees in separation representing a three phase system.

19. The method of claim 17, further comprising coupling a rechargeable battery to an output of the rectifier.

20. The method of claim 17, wherein a frequency of the PWM signal is operated at a frequency of at least one of 30 kHz, 60 kHz, 25 kHz and 50 kHz.

* * * * *